United States Patent
Ledentsov

(10) Patent No.: US 12,346,465 B2
(45) Date of Patent: Jul. 1, 2025

(54) COMPUTER-IMPLEMENTED METHOD FOR ASSISTING A USER IN DEBUGGING ROLES IN A SOFTWARE SYSTEM

(71) Applicant: Siemens Aktiengesellschaft, Munich (DE)

(72) Inventor: Dmitry Ledentsov, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 195 days.

(21) Appl. No.: 18/215,885

(22) Filed: Jun. 29, 2023

(65) Prior Publication Data
US 2025/0005173 A1 Jan. 2, 2025

(51) Int. Cl.
*G06F 21/60* (2013.01)
*G06F 11/32* (2006.01)
*G06F 11/362* (2025.01)

(52) U.S. Cl.
CPC .......... *G06F 21/604* (2013.01); *G06F 11/323* (2013.01); *G06F 11/362* (2013.01); *G06F 11/3656* (2013.01)

(58) Field of Classification Search
CPC .... G06F 21/604; G06F 11/323; G06F 11/362; G06F 11/3656
See application file for complete search history.

(56) References Cited

U.S. PATENT DOCUMENTS

| | | | | |
|---|---|---|---|---|
| 2008/0115115 | A1* | 5/2008 | Codrescu | G06F 11/3656 717/128 |
| 2015/0347274 | A1* | 12/2015 | Taylor | G06F 11/3698 717/125 |
| 2022/0164463 | A1* | 5/2022 | Zheng | G06F 11/3698 |
| 2023/0035335 | A1* | 2/2023 | Badawy | G06F 21/604 |
| 2023/0370466 | A1* | 11/2023 | Li | H04L 63/101 |

* cited by examiner

Primary Examiner — Ellen Tran
(74) Attorney, Agent, or Firm — Schmeiser, Olsen & Watts LLP

(57) ABSTRACT

The disclosed includes the steps of: providing a predetermined set of recorded roles whereby the user associated with the recorded roles contains at least a permission allowing the user to get access to resources of a technical system during execution of the software system on the technical system, computing a plurality of combinations of intersection sets based on the predetermined recorded roles if the at least one permission of the first and the at least one permission of the second further role overlaps, creating a Venn diagram with a first and second graphical display element representing a first role and a second further role respectively; and displaying the Venn diagram for use by a user in debugging the roles in the software system, wherein the first and the second display element is placed in a visual representation to give the user the cue for each of the intersection sets.

9 Claims, 6 Drawing Sheets

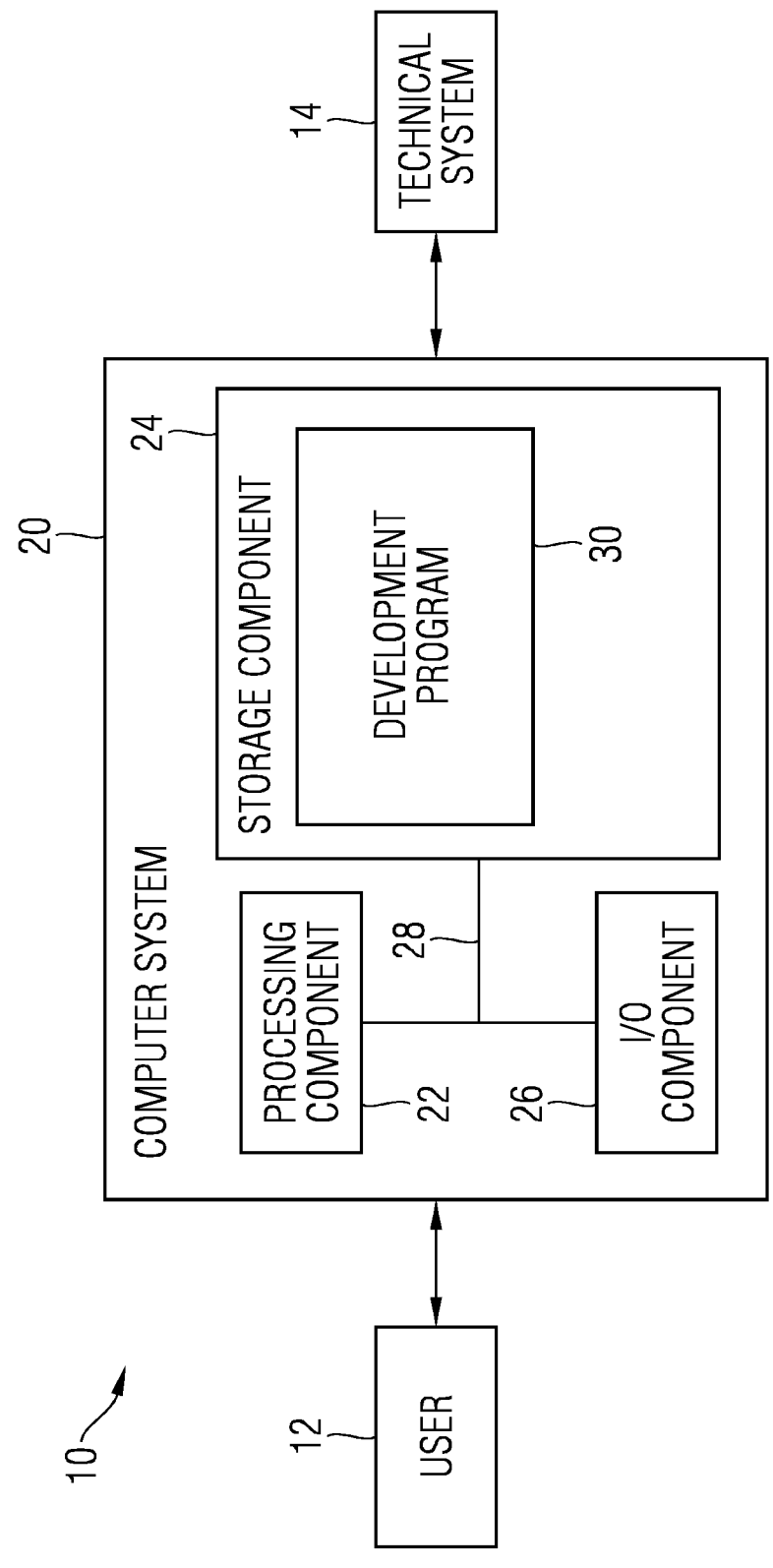

COMPUTER-IMPLEMENTED METHOD FOR ASSISTING A USER IN DEBUGGING ROLES IN A SOFTWARE SYSTEM

FIELD OF TECHNOLOGY

The present invention relates to computer-implemented method for assisting a user in debugging roles in a software system and a visual display for use by a user in debugging roles.

BACKGROUND

In computer systems security a form of access control or authorization is used. The complexity of the access control implementation can quickly go out of hand. A role-based access control (RBAC) helps to model access control efficiently, but even then, the model can become hard to analyze and to understand.

Role-based access control (RBAC) is an approach to restricting system access to authorized users. The user can be a human being or a bot (https://en.wikipedia.org/wiki/Internet_bot).

Role-based access (RBAC, https://en.wikipedia.org/wiki/Role-based_access_control) control is a policy-neutral access-control mechanism defined around roles and privileges. The components of RBAC such as role-permissions, user-role and role-role relationships make it simple to perform user assignments.

When defining an RBAC model, the following conventions are useful:
S=Subject=A user/developer or automated agent.
R=Role=function or title which defines an authority level
P=Permissions=An approval of a mode of access to an object and/or a resource.
SE=Session=A mapping involving S, R and/or P
SA=Subject Assignment
PA=Permission Assignment
RH=Partially ordered Role Hierarchy. RH can also be written: ≥(The notation: x≥y means that x inherits the permissions of y.)
A subject can have multiple roles.
A role can have multiple subjects.
A role can have many permissions.
A permission can be assigned to many roles.
An operation can be assigned to many permissions.
A permission can be assigned to many operations.

For instance, the following roles on the left-hand side and the permissions (access rights) on the right-hand side are possible, where permissions can contain a previously defined role:
reader=read_permission
reporter=report permission, reader
writer=write_permission, reporter
admin=admin_permission, writer A constraint places a restrictive rule being used to achieve appropriate separation of duties. For example, the same user should not be allowed to both create a login account and to authorize the account creation.

Up to now, access control has been either analyzed in production, or manually tested based on simulations. The most complex solution would be to utilize property-based testing to the problem.

In view of this, it is an objective of the present invention to present an improved concept or method or system that assists a user in debugging roles for testing them via an improved overview and/or understanding of a software system.

SUMMARY

The above-mentioned object is achieved by a method and one or more apparatus and/or a system and/or a device according to the features of the independent claims.

Embodiments of the invention are described in the dependent claims. Any combination of the features of the dependent claims to each other and with the features of the independent claims is possible.

A first aspect of the invention is a computer-implemented method for assisting a user in debugging roles, in particular for testing roles, in a software system comprising the steps of:

providing a predetermined set of recorded roles whereby the user associated with at least one of the recorded roles which contains at least an access right allowing the user to get access to objects and/or resources of a technical system during execution of the software system on the technical system, computing a plurality of combinations of intersection sets based on the predetermined recorded roles if the at least one permission of the first and the at least one permission of the second further role overlaps, creating a Venn diagram with a first graphical display element (e.g., circle) representing a first role and at least a second further graphical display element representing at least a second further role; and displaying the Venn diagram for use by a user in debugging the roles in the software system, wherein the first and the second display element is placed in a visual representation (e.g., on a visual display) so as to give the user the cue for/to one or for each of the intersection sets.

This step can be repeated. As a result, several display elements can be placed.

The method can be executed during operation or employed for a system configuration. A Venn diagram may also be called a set diagram or logic diagram. It is a diagram that shows all possible logical relations between a finite collection of different sets. These diagrams depict elements as points in the plane, and sets as regions inside closed display elements, particularly closed curves. A Venn diagram consists of multiple overlapping closed curves, usually circles, each representing a set. The points inside a curve labelled for instance S represent elements of the set S, while points outside the boundary represent elements not in the set S. This lends itself to intuitive visualizations: for example, the set of all elements that are members of both sets S and T, denoted S∩T and read "the intersection (set) of S and T", is represented visually by the area of overlap of the regions S and T. In Venn diagrams, the curves are overlapped in a computed selection from possible combinations of the intersections set, showing all possible relations between the sets in an efficient and optimized way.

(https://en.wikipedia.org/wiki/Venn_diagram)

As used herein, unless otherwise noted, the term 'set' means one or more (i.e., at least one) set elements.

It is understood that the term "circle", when used in conjunction with the Venn diagram, includes any closed plane figure for identifying a category in the Venn diagram (e.g., ellipse, polygon, irregular shape, and/or the like).

According to the invention a set e.g., S represents a first role. A set e.g., T may represent a second role and so on. An intersection (set) of the two or more sets results from computing overlap between permissions of the first role and permissions of the second role and/or a third role etc.

The inventive visual representation leads the user in such a way that the user can note that each permission (underscored permission) is seen only once in the visual representation (picture). Roles whose permissions do not overlap shall not be shown in an intersection area.

The plurality of intersection sets can be computed according to the following steps:
   partitioning the predetermined set of recorded roles into disjoint groups;
   forming each combination of the roles in each group;
   classifying each of the formed combinations in a first category defined by combinations with at least one exclusive permission or in a second category defined by combinations with at least one overlapping permission or in a third category defined by combinations with unified permissions.

If a combination of the formed combinations is a mismatch of said categories then this combination should be removed and said display elements should be reorganized and presented again.

To quickly grasp all the permissions available to a role, the user can concentrate on one circle of that role. The user can also see which further permissions would be available when adding another role. However, a user can also see, which unique rights, adding roles allow.

Additional/supplementary information can be dynamically presented if the user focusses on the unique intersection. A tooltip (https://en.wikipedia.org/wiki/Tooltip) or any other mechanism including supplementary information regarding the permissions appears when hovering over an intersection set of the presented display elements via user interaction, e.g. by guiding a mouse pointer to the unique intersection or selecting it by any other mechanism, e.g. touch, keypress or mouse click.

An intersection set gets a higher priority than other intersection sets and is marked as such if the permission of the first role is more privileged than the permission of the second role or vice versa. Such type of Venn Diagram, where the closed display elements, in particular circles are role and where the permissions are visible inside unique intersections of the role's permission sets, provides the user, who can be a customer and/or developer, or also a bot an overview to decide if the permissions are correctly given or set. The complexity of the access control implementation is reduced. A permission should be displayed just once for the role combinations.

A further aspect of the invention further is a visual display for use by a user in debugging roles, in particular for testing roles, in a software system, comprising a Venn diagram responsive to a predetermined set of recorded roles whereby the user associated with at least one of the recorded roles which contains at least an permission allowing the user to get access to objects and/or resources of a technical system during execution of the software system on the technical system, wherein the Venn diagram includes:
   a first graphical display element representing a first role; and
   at least a second further graphical display element representing at least a second further role;
   a plurality of combinations of intersection sets computed, by a computing module connected with the visual display, and displayed based on the predetermined recorded roles if the at least one permission of the first and the at least one permission of the second further role overlaps,
   a visual representation of the first and the second display element is placed on the visual display so as to give the user the cue for/to one or for each of the intersection sets. Several first and second display elements can be placed.

The visual representation of said display elements can be reorganized after above mentioned computation of the plurality of intersections sets.

The visual representation of said display elements can show a tooltip including supplementary information regarding the access rights appears when hovering over an intersection set of the presented display elements via user interaction.

The visual display can include one or more processors or can be connected to a computing system (e.g. a server or cloud) integrating one or more processors.

Embodiments as described above for the visual display can be analogous applied for the method and for computer program (product) and for the computer-readable storage medium.

The computer-readable storage medium stores instructions executable by one or more processors of a computer, wherein execution of the instructions causes the computer system to perform the method.

The computer program (product) (non-transitory computer readable storage medium having instructions, which when executed by a processor, perform actions) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. In the figures, identical or functionally identical elements are denoted by identical reference signs. Included in the drawings are the following figures:

FIG. 9 schematically shows a system connected with a visual display which is configured to perform the inventive method.

DETAILED DESCRIPTION

Figure 1:
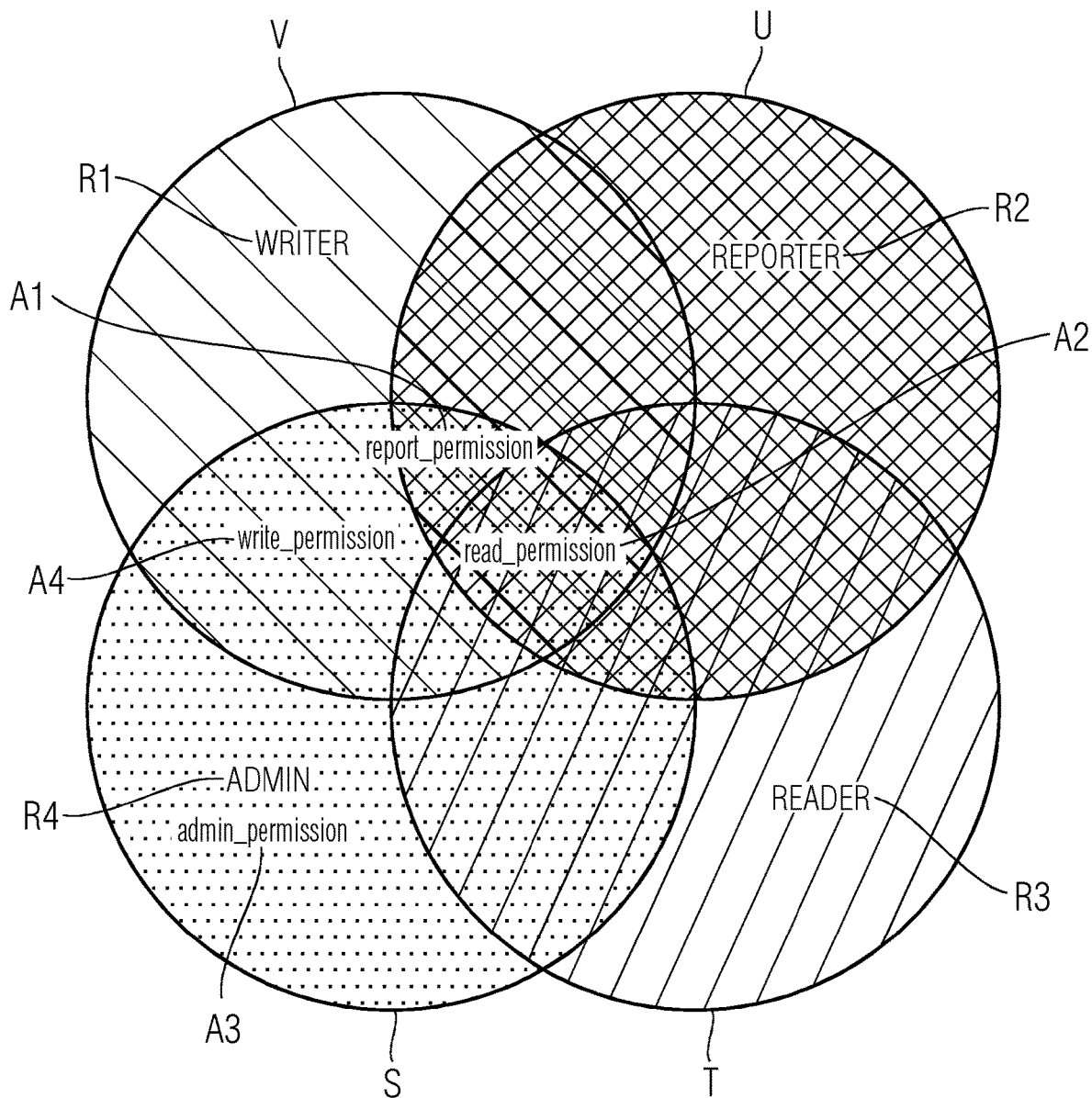
FIG. 1 illustrates a Venn diagram according to the invention.

Turning to the drawings, FIG. 9 shows an illustrative environment 10 for assisting a user in debugging roles in a software system on a technical system 14 according to an embodiment. To this extent, environment 10 includes a computer system 20 that can perform a process described herein in order to create a Venn diagram. In particular, computer system 20 is shown including a debugging program 30, which is used by a user in order to debug roles in a not shown software system which is stored on the technical system 14.

Computer system 20 is shown including processing component 22 (e.g., one or more processors), a storage component 24 (e.g., a storage hierarchy), an input/output (I/O) component 26 (e.g., one or more I/O interfaces and/or a visual display device), and a communications pathway 28. In general, processing component 22 executes program code. Such as the debugging program 30, which is at least partially stored in Storage component 24. While executing program code, processing component 22 can read and/or write data to/from storage component 24 and/or I/O component 26. Pathway 28 provides a communications link between each of the components in computer system 20. I/O component 26 can comprise one or more visual display devices, which enable a human user 12 to interact with computer system 20 and/or one or more communications devices to enable a system user 16 to communicate with computer system 20 using any type of communications link.

As used herein, it is understood that "program code" means any collection of instructions, in any language, code or notation, that cause a computing device having an information processing capability to perform a particular function either directly or after any combination. Further, it is understood that some of the functionality discussed herein may not be implemented or additional functionality may be included as part of computer system 20.

However, it is understood that computer system 20 and debugging program 30 are only representative of various possible equivalent computer systems that may perform a process described herein. To this extent, in other embodiments, the functionality provided by computer system 20 and development program 30 can be at least partially implemented by one or more computing devices that include any combination of general and/or specific purpose hardware with or without program code. In each embodiment, the hardware and program code, if included, can be created using Standard engineering and programming techniques, respectively.

As used herein, the term "a technical system" refers, for example, to a device, apparatus or a plant. A technical system can, for example, be a field device. Typically, the technical system comprises a plurality of interconnected hardware components and/or a software system which may comprises software modules. Furthermore, the technical system can, for example, comprise at least one component having a communication interface configured to connect an apparatus/system to an environment, user and/or other system.

Here and in the following, interface, function, storage as well as other units or devices referred to, may for example be software modules of a computer program for carrying out the computer-implemented method. Alternatively, the modules may interact with respective hardware components with software for carrying out the respective steps stored on them.

Figure 2:
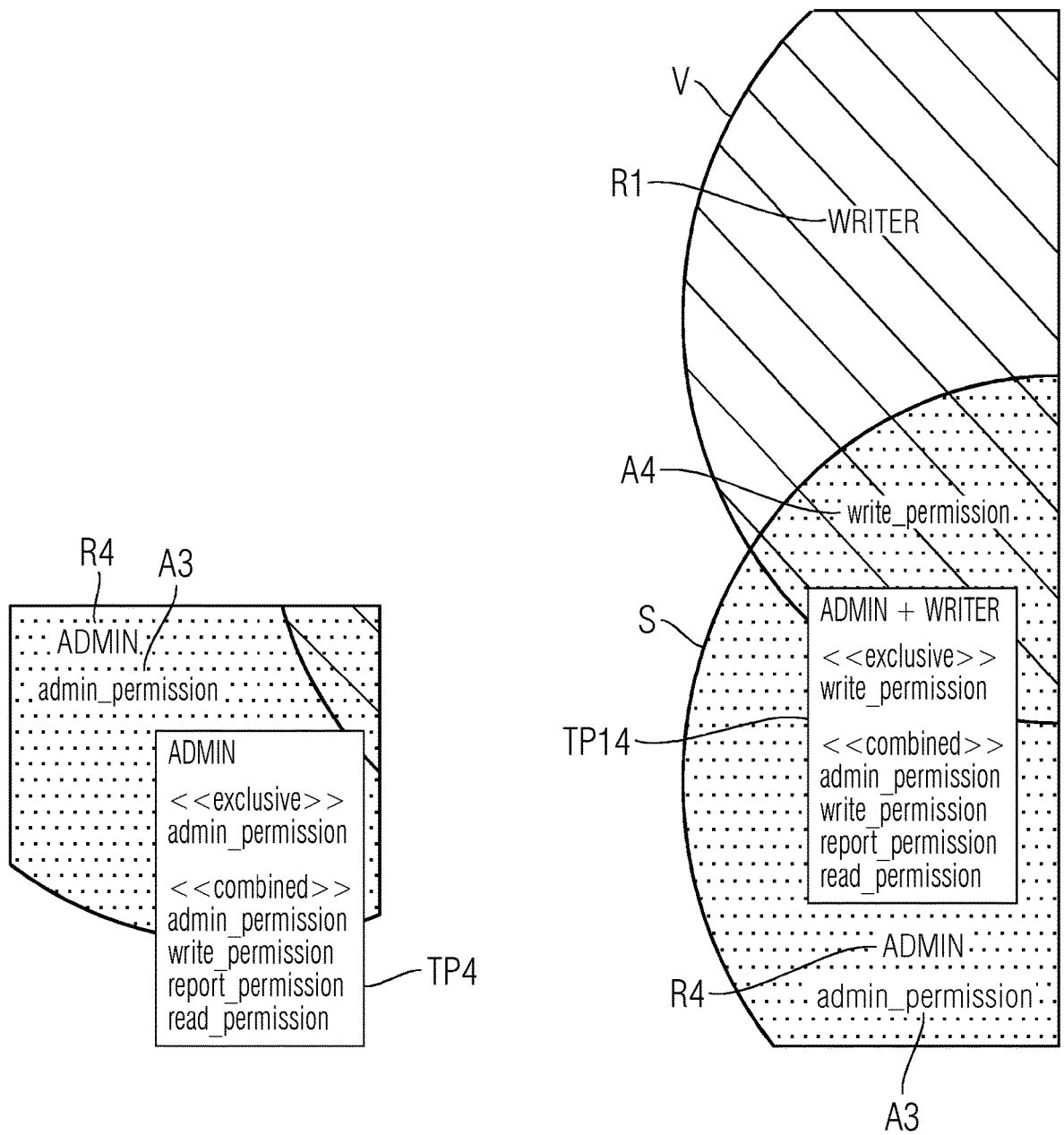
FIG. 2 depicts a portion of the Venn diagram which includes supplementary information showing exclusive or overlapping access rights.

Embodiments of the invention provide a solution that utilizes a Venn diagram to enable user(s) to interactively explore the issues from multiple perspectives simultaneously. Utilizing the Venn diagram, e.g. as shown in FIGS. 1 and 2, user(s) will be enabled to get more structured information in a fast way. For example, the technical system can comprise a Software system and system data comprising a predetermined set of recorded roles, whereby at least one of the recorded roles contains at least a permission allowing the user to get access to resources of a technical system during execution of the software system on the technical system.

As indicated above, embodiments of the invention provide a solution that displays the Venn diagram for use by a user in debugging the roles in the software system, wherein the first and the second display element is placed in a visual representation so as to give the user the cue for one or for each of the intersection sets.

In particular, the processing component 22 directly or indirectly connected to the technical system computes a plurality of combinations of intersection sets based on the predetermined recorded roles if the at least one permission of the first and the at least one permission of the second further role overlaps.

A Venn diagram, as shown for instance in FIG. 1, is generated that includes a circle V, U, S, T for each role R1, R2, R3, R4 and displays visual representation so as to give the user the cue for one or for each of the intersection sets, which is computed based on the predetermined recorded roles if the at least one permission e.g. A2 of the first role S and the at least one permission of the second further role T overlaps.

For example, the access rights e.g. A3 are displayed using tags for each role that are placed in each circle. Two or more circles can overlap in which case the roles in circle have access rights which overlap. An intersection set may get a higher priority than other intersection sets and is marked as such if the permission of the first role is more privileged than the permission of the second role or vice versa.

In this manner, a user can utilize the Venn diagram to identify relationships between various roles and the corresponding access rights, and as a result, more readily identify high value/priority entries.

In FIG. 2 examples for tooltips TP4, TP14 are shown whereby each tooltip includes additional/supplementary information like exclusive access rights of a pointed circle and/or combined access rights of overlapping circles. Such information is available, if an unique intersection is focussed by the user.

In order to draw a Venn diagram as such each permission (access right) is found in the diagram only once but belongs to each circle (role). The following algorithm is applied:

1. Parse the input. A predetermined set of recorded roles is provided whereby the user associated with at least one of the recorded roles which contains at least a permission allowing the user to get access to resources of a technical system during execution of the software system on the technical system. Such recorded roles are configurable.

Figure 3:
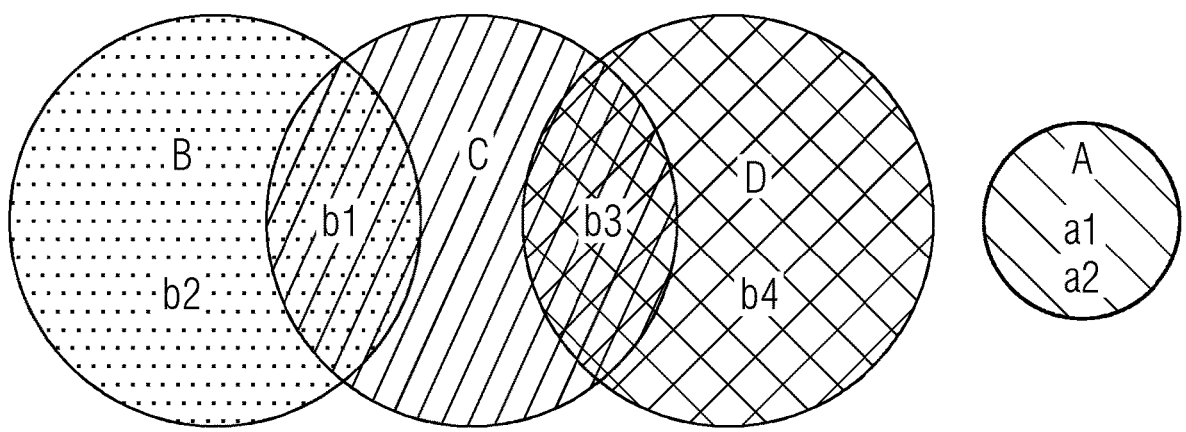
FIG. 3 illustrates the algorithm how to build a Venn diagram, in particular how to compute the intersection sets.

2. Partition the Roles (here A, B, C, D and see FIG. 3) into disjoint groups e.g. given Roles with permissions a1, a2; b1, b2, b3, b4:

A=a1,a2
B=b1,b2
C=b1,b3
D=b3,b4
into
group 1:
A=a1,a2
group 2:
B=b1,b2
C=b1,b3
D=b3,b4

Figure 4:
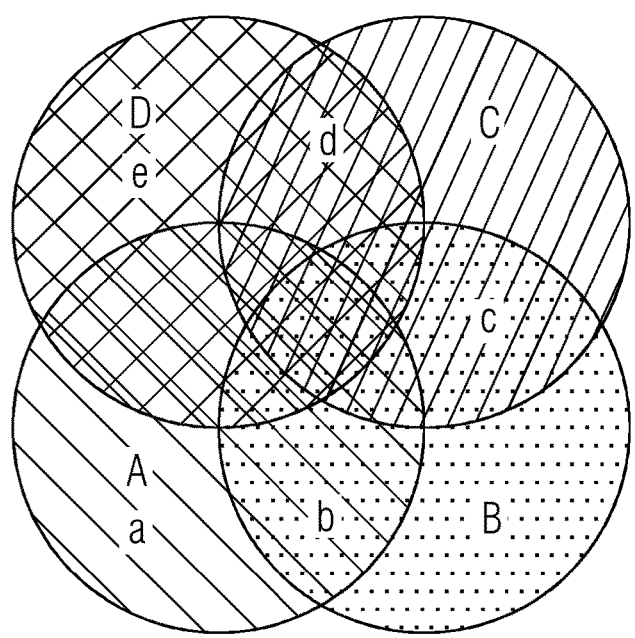
FIG. 4 illustrates the algorithm how to build a Venn diagram, in particular how to compute the intersection sets.
Figure 5:
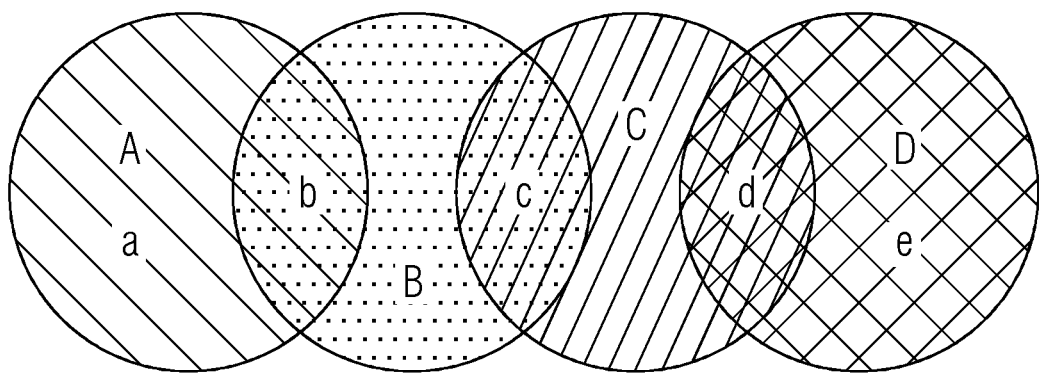
FIG. 5 illustrates the algorithm how to build a Venn diagram, in particular how to compute the intersection sets.
Figure 6:
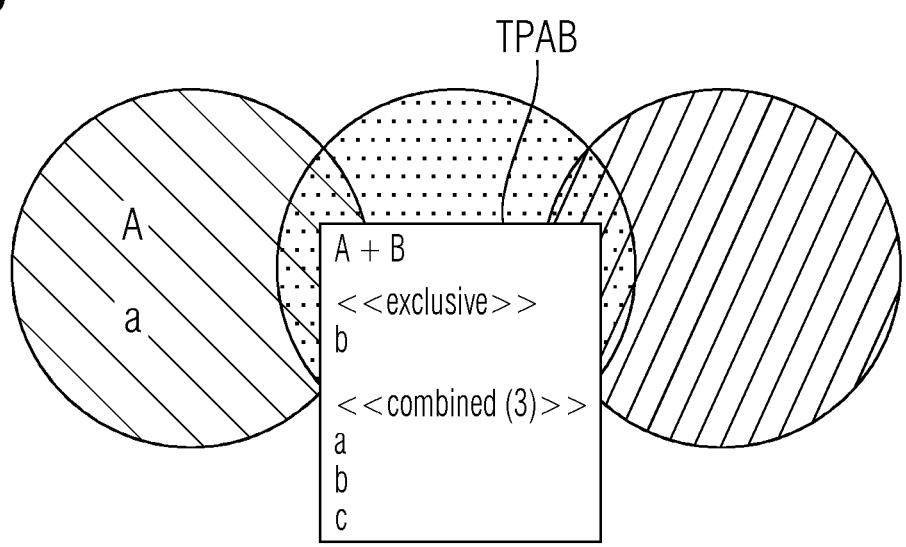
FIG. 6 illustrates the algorithm how to build a Venn diagram, in particular how to compute the intersection sets.
Figure 7:
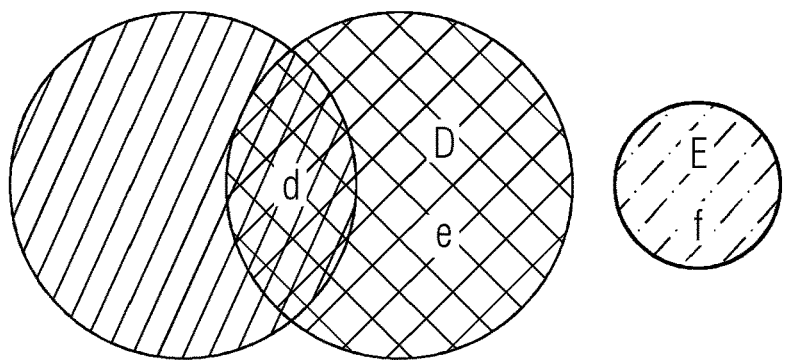
FIG. 7 illustrates the algorithm how to build a Venn diagram, in particular how to compute the intersection sets.

3. Get all combinations of roles per group
e.g.
group 1:
 A
group 2:
 B
 C
 D
 B, C
 B, D
 C, D
 B, C, D
4. For each combination: prepare input data, find and classify each combination in a category:
 a. combined, exclusive permissions and permission intersection of the combination:
  group 1:
   combination ['A'] exclusive permissions ['a1', 'a2']
   combination ['A'] combined permissions ['a1', 'a2']
   combination ['A'] permissions intersection ['a1', 'a2']
  group 2:
   combination ['B'] exclusive permissions ['b2']
   combination ['B'] combined permissions ['b1', 'b2']
   combination ['B'] permissions intersection ['b1', 'b2']
   ... etc. for single roles
   combination ['B', 'C'] exclusive permissions ['b1']
   combination ['B', 'C'] combined permissions ['b1', 'b2', 'b3']
   combination ['B', 'C'] permissions intersection ['b1']
   combination ['B', 'D'] exclusive permissions [ ]
   combination ['B', 'D'] combined permissions ['b1', 'b2', 'b3', 'b4']
   combination ['B', 'D'] permissions intersection [ ] note the empty intersection
   ... etc. for two-role combinations
   combination ['B', 'C', 'D'] exclusive permissions [ ]
   combination ['B', 'C', 'D'] combined permissions ['b1', 'b2', 'b3', 'b4']
   combination ['B', 'C', 'D'] permissions intersection [ ] note the empty intersection
 b. Try to remove large empty confusing overlaps, which do not match based on the following criteria: the permission intersection must not be empty e.g. given:
  A=a,b
  B=b,c
   C=c,d
   D=d,e
  the previous stage would result in large intersections that suggest role intersections, where there are none. See FIG. 4, before the removal of empty overlaps. See FIG. 5 after the removal.
5. Combine the disjoint group data into a single input data (simple append) as shown in FIG. 6 where the circles are reorganized.
6. Enhance the input data with additional information necessary to draw the interactive diagram, such as hints for overlay information. See e.g. the tooltip TPAB in FIG. 6.
7. Circle size can be fitted. See FIG. 7
8. An intersection set gets a higher priority than other intersection sets and can be marked as such if the permission of the first role is more privileged than the permission of the second role or vice versa.

In order to optimize input of the role definitions, the previous roles may be referred to the definition of the subsequent roles, whereby the role "somebody" has been introduced.

Example reader=read_permission
reporter=repor_permission, reader
writer=write_permission, reporter
admin=admin_permission, writer
somebody=reader, reporter
the list of permissions for each role is a set (unique values) from the list of all permissions and roles of a role definition, e.g. Role "admin" has all known permissions.

Figure 8:
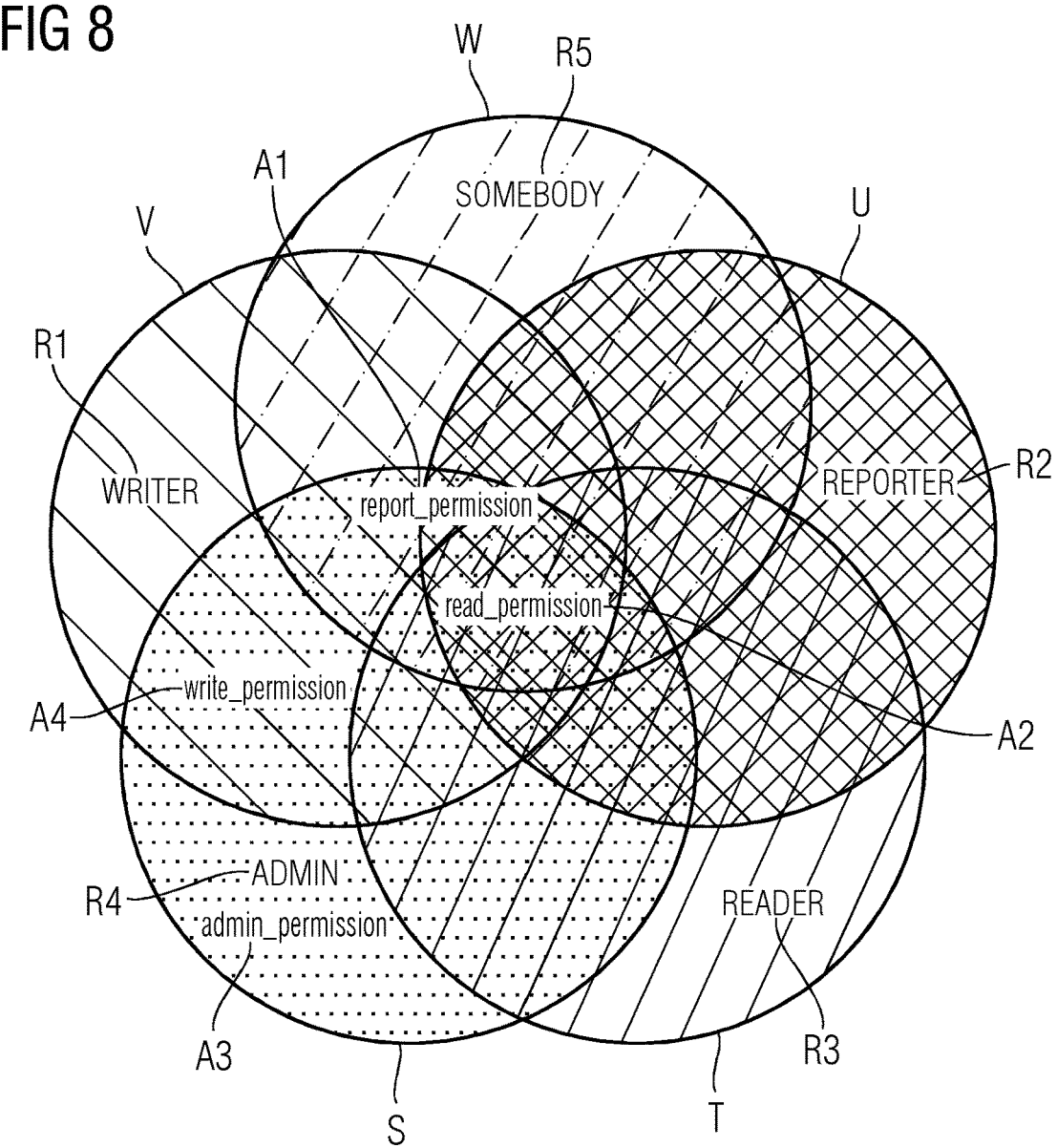
FIG. 8 depicts a reorganized Venn diagram if a further role is introduced.

FIG. 8 depicts a reorganized Venn diagram if a further role "somebody" R5 represented by circle W is introduced.

The invention has been described in detail with reference to embodiments thereof and examples. Variations and modifications are possible. Instead of the above-described production process one or more processes can analogously be applied to other technical systems.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and nonvolatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The embodiments have been described in detail with reference to embodiments thereof and examples. Variations and modifications may, however, be effected within the spirit and scope of the embodiments covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of embodiments of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for assisting a user in debugging roles in a software system comprising the steps of:
providing a predetermined set of recorded roles whereby the user associated with at least one of the recorded roles which contains at least a permission allowing the user to get access to resources of a technical system during execution of the software system on the technical system, computing a plurality of combinations of intersection sets based on the predetermined recorded roles if the at least one permission of a first of the roles and the at least one permission right of a second further role of the roles overlaps,
creating a Venn diagram with a first graphical display element representing the first role and at least a second further graphical display element representing the at least one second further role; and
displaying the Venn diagram for use by a user in debugging the roles in the software system, wherein the first and the second display element is placed in a visual representation so as to give the user the cue for one or for each of the intersection sets.

2. The method according to claim 1, wherein the plurality of intersection sets is computed according to the following steps:
partitioning the predetermined set of recorded roles into disjoint groups;
forming each combination of the roles in each group;
classifying each of the formed combinations in a first category defined by combinations with at least one exclusive permission or in a second category defined by combinations with at least one overlapping permission or in a third category defined by combinations with unified permissions.

3. The method according to claim 2, wherein if a combination of the formed combinations is a mismatch of said categories then this combination is removed and said display elements are reorganized and presented.

4. The method according to claim 3, wherein a tooltip including supplementary information regarding the permissions appears when hovering over an intersection set of the presented display elements via user interaction.

5. The method according to claim 1, wherein an intersection set gets a higher priority than other intersection sets and is marked as such if the permission of the first role is more privileged than the permission of the second role or vice versa.

6. A visual display for use by a user in debugging roles in a software system, comprising a Venn diagram responsive to a predetermined set of recorded roles whereby the user associated with at least one of the recorded roles which contains at least a permission allowing the user to get access to resources of a technical system during execution of the software system on the technical system, wherein the Venn diagram includes:
a first graphical display element representing a first role; and
at least a second further graphical display element representing at least a second further role;
a plurality of combinations of intersection sets computed, by a computing module connected with the visual display, and displayed based on the predetermined recorded roles if the at least one permission of the first and the at least one permission of the second further role overlaps, a visual representation of the first and the second display element is placed on the visual display so as to give the user the cue for one or for each of the intersection sets.

7. The visual display according to claim 6, wherein the visual representation of said display elements is reorganized after computation of the plurality of intersections sets by:
partitioning the predetermined set of recorded roles into disjoint groups;
forming each combination of the roles in each group;
classifying each of the formed combinations in a first category defined by combinations with at least one exclusive permission or in a second category defined by combinations with at least one overlapping permission or in a third category defined by combinations with unified permissions, and after removal of a combination if such combination of the formed combinations is a mismatch of said categories.

8. The visual display according to claim 7, wherein the visual representation of said display elements shows a tooltip including supplementary information regarding the permissions appears when hovering over an intersection set of the presented display elements via user interaction.

9. A computer program product including a non-transitory computer readable storage medium having instructions, which when executed by a processor, perform actions which is being executed by one or more processors of a computer or of the visual display according to claim 1 in order to execute a method.

* * * * *